Sept. 18, 1962 E. W. PEARSON 3,054,316
SHEAR MACHINE AND HOLD-DOWN ASSEMBLY THEREFOR
Filed June 20, 1958 5 Sheets-Sheet 4
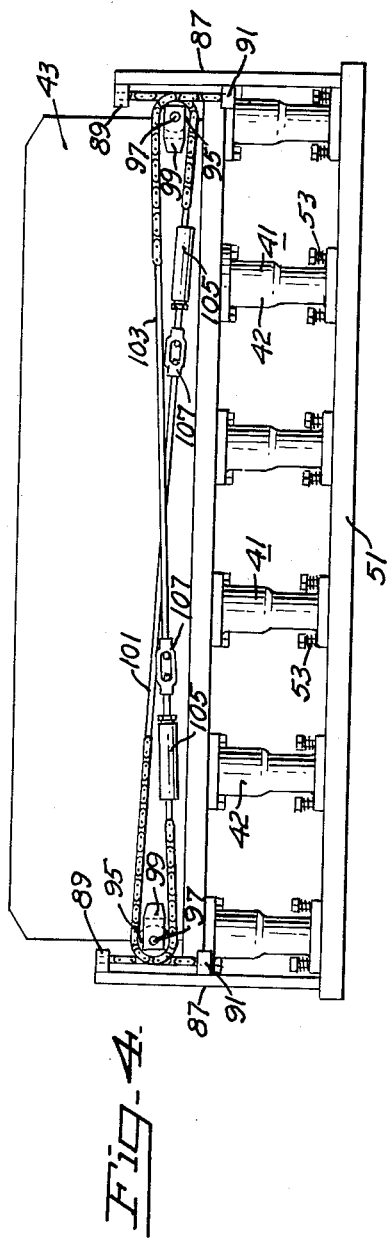
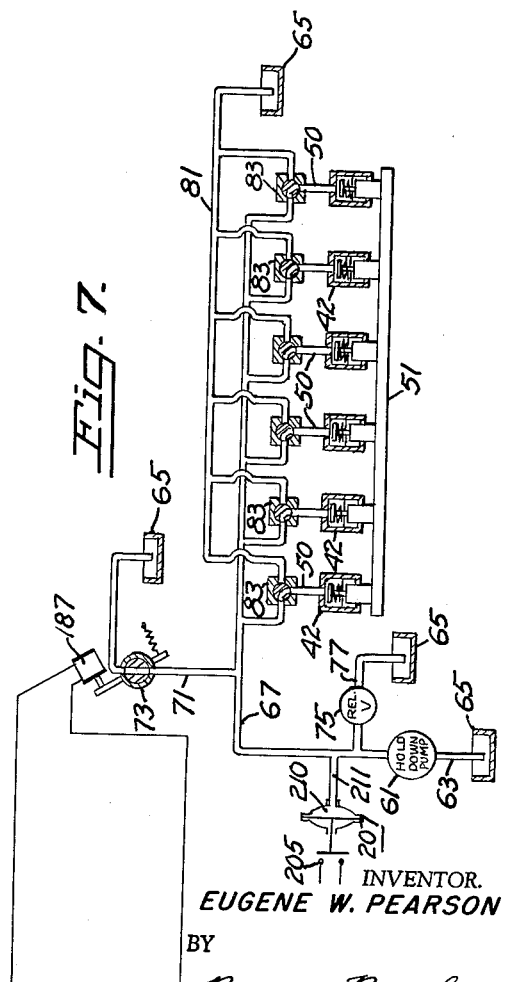
INVENTOR.
EUGENE W. PEARSON
BY
Bruce & Brosler
HIS ATTORNEYS

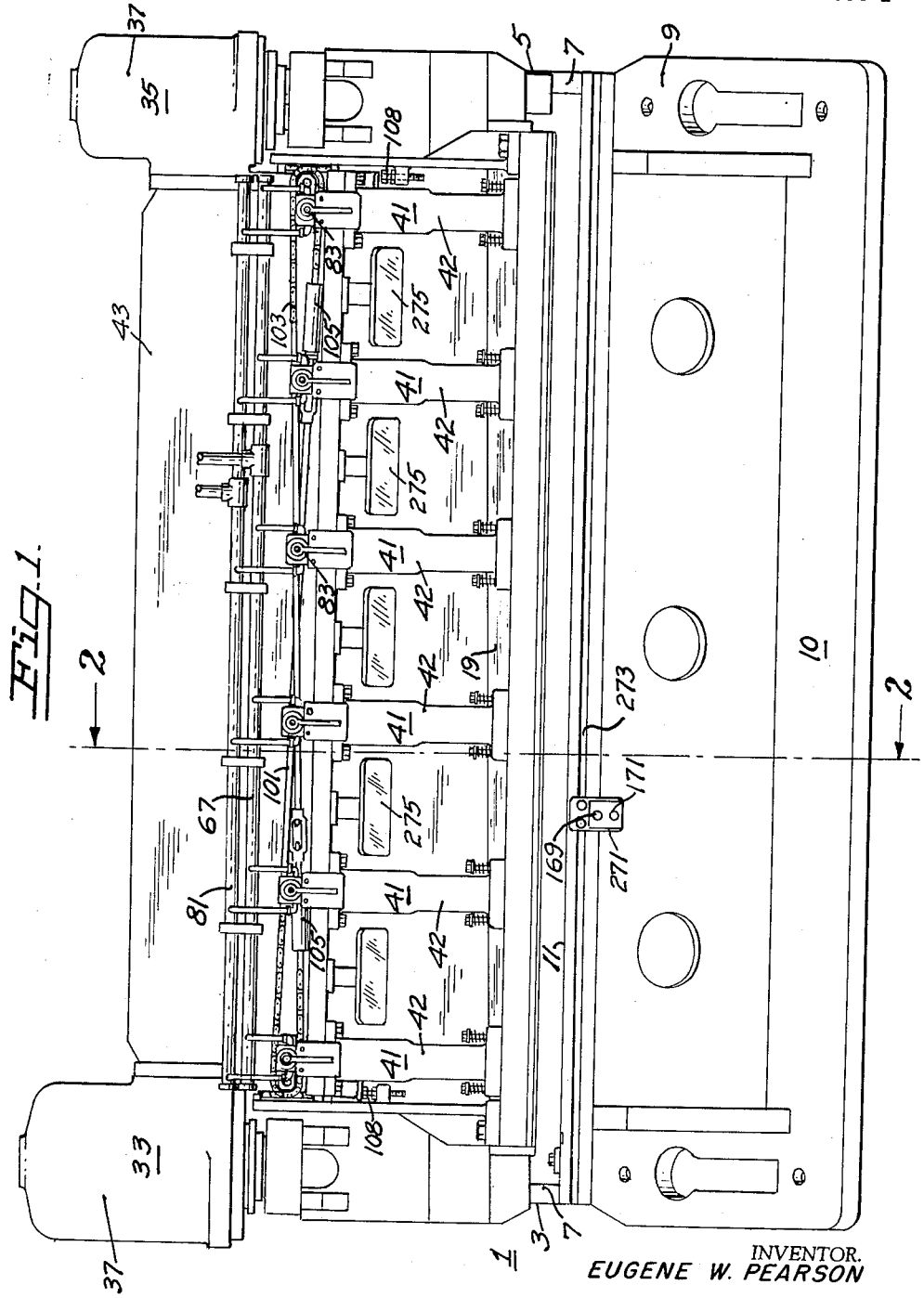

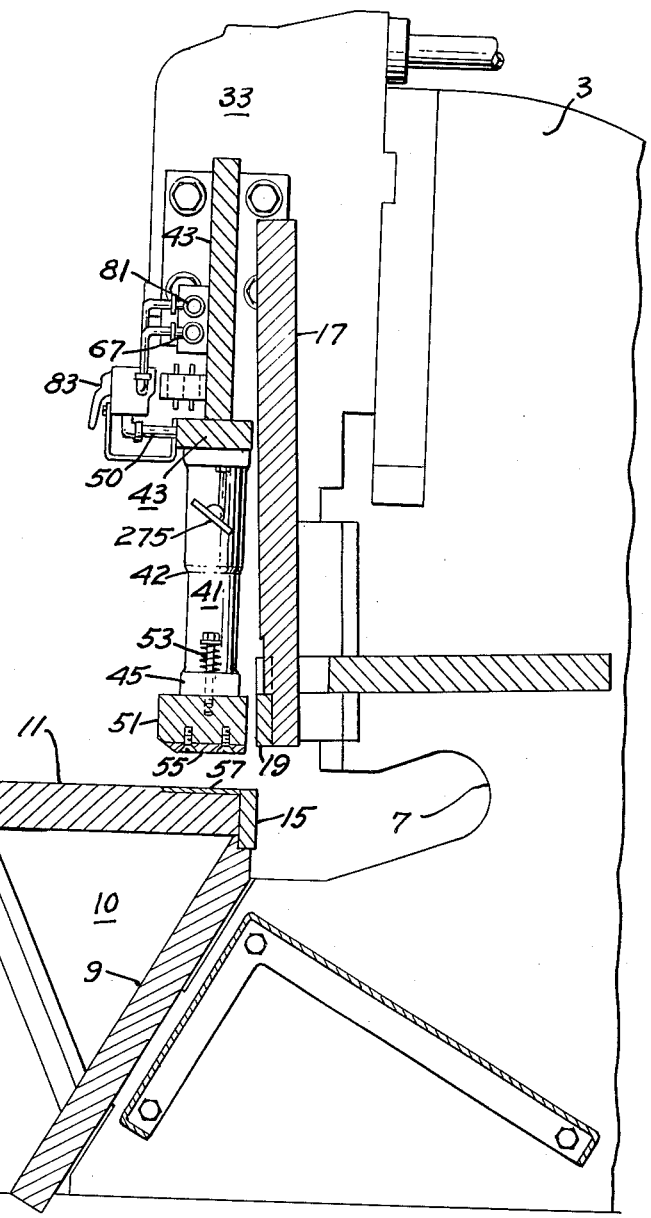

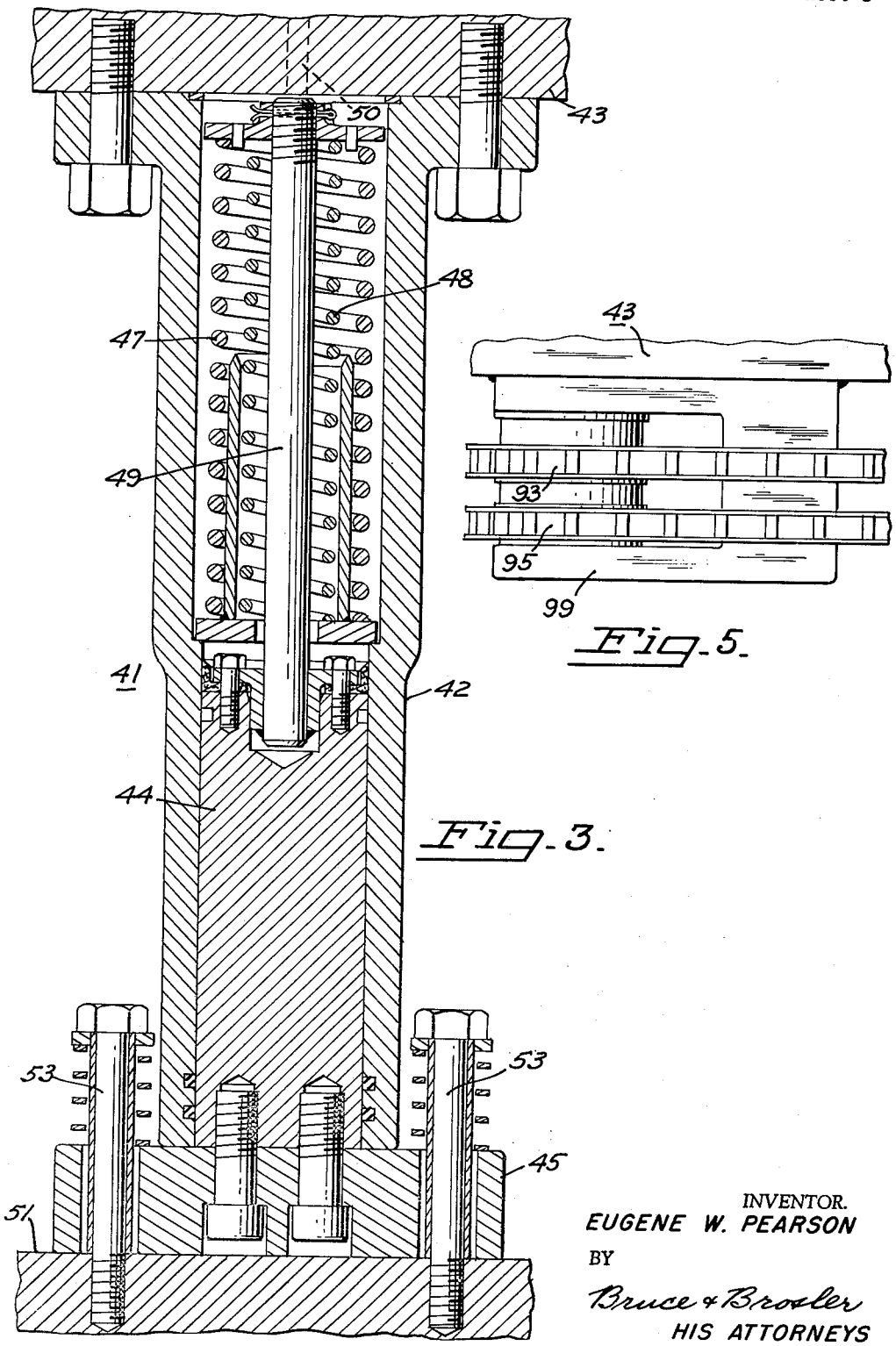

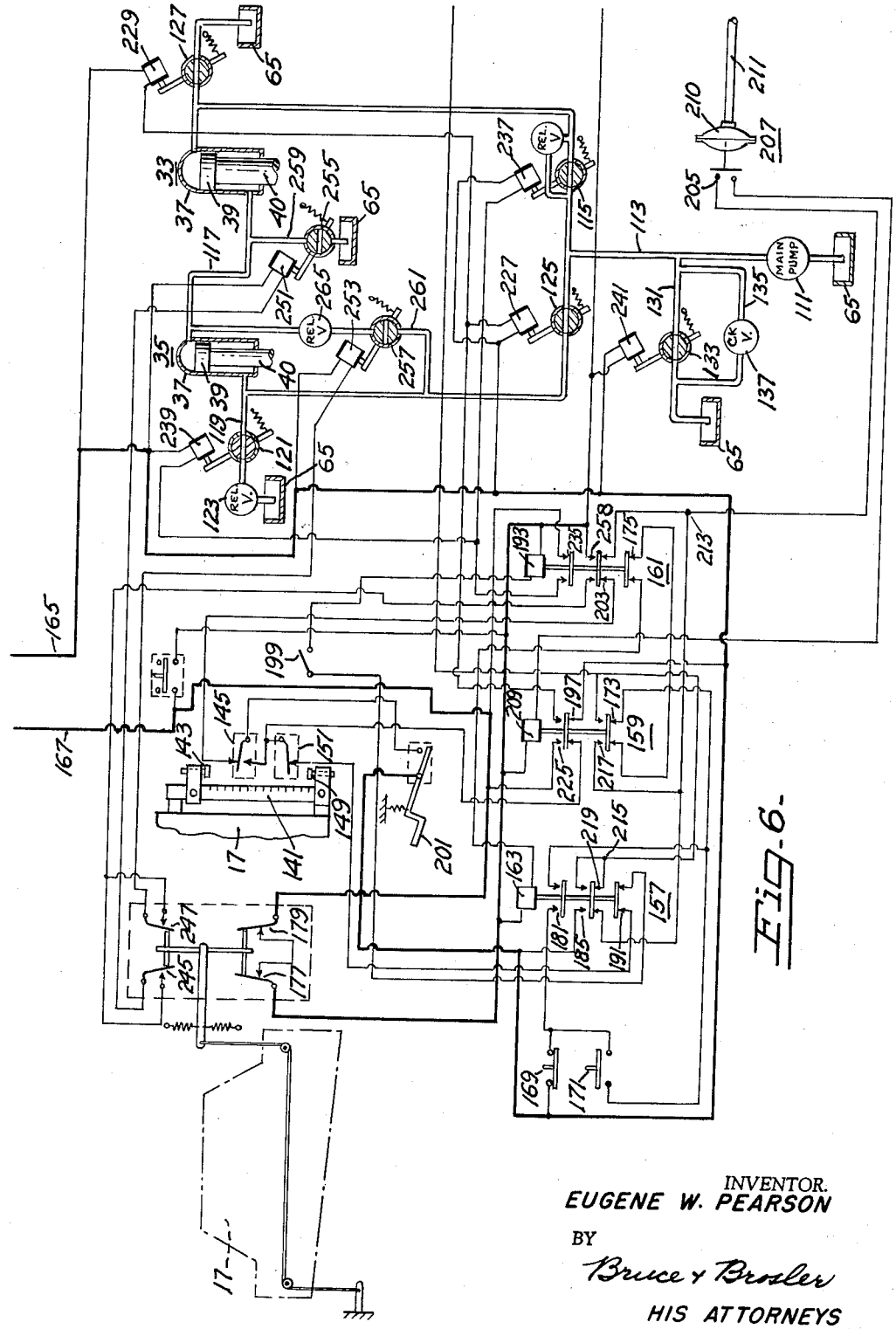

United States Patent Office 3,054,316
Patented Sept. 18, 1962

3,054,316
SHEAR MACHINE AND HOLD-DOWN ASSEMBLY THEREFOR
Eugene W. Pearson, Orinda, Calif., assignor to Pacific Industrial Manufacturing Co., a corporation of California
Filed June 20, 1958, Ser. No. 743,391
7 Claims. (Cl. 83—390)

My invention relates to shear machines and the like and more particularly to hold-down assembly means employed in holding the work to a table or support while a shearing or comparable operation is performed on the work.

Due primarily to the fact that in a shear machine, the upper knife is not in the plane of the lower knife but is offset therefrom to permit of the shearing action between knives, the upper knife in engaging the work, tends to frictionally drag the work down over the lower knife during shearing. This dragging action is somewhat aggravated by the normally angular disposition or rake angle of the upper knife, which tends to introduce a turning moment in a direction normal thereto.

Where the work to be sheared is of heavy metal plate, conventional hold-down pistons may be employed without adverse effect from the forces discussed above.

However, where the work to be sheared is of the nature of wire mesh, wire cloth or screen, which by their very nature is capable of stretching, twisting and distorting under the effect of such forces, a serious problem results, for under such conditions a sharp accurate shearing cut is not likely to be achieved, and such problem becomes increasingly complex where the width of work to be sheared is not apt to be uniform, but may vary widely as to this dimension.

Among the objects of my invention are:
(1) To provide a novel and improved shear machine;
(2) To provide a novel and improved shear machine of the hydraulic type;
(3) To provide a novel and improved hold-down assembly means for a shear machine;
(4) To provide novel and improved hold-down assembly means for a shear machine, adapting such machine to the shearing of material such as wire mesh, wire cloth, or the like;

Additional objects of my invention will be brought out in the following description of a preferred embodiment of the same, taken in conjunction with the accompanying drawings wherein;

FIGURE 1 is a view in elevation of a shear machine embodying the present invention;

FIGURE 2 is a view in section taken in the plane 2—2 of FIGURE 1;

FIGURE 3 is an enlarged view in section, depicting in detail the hold-down means incorporated in the machine of FIGURE 1;

FIGURE 4 is a view depicting an equalizer system associated with the hold-down means of FIGURE 3;

FIGURE 5 is a detail of the equalizer system of FIGURE 3;

FIGURES 6 and 7 together depict the combined electrical-hydraulic systems of the particular shear machine of FIGURE 1.

Referring to the drawings for details of my invention in its preferred form, the same is shown incorporated in a hydraulically powered shear machine comprising a frame 1 involving a pair of spaced side walls 3 and 5, each formed with a relative deep throat 7 in the front edge thereof.

Spanning the side walls, along the front edges thereof below the throats is a front wall 9 constituting a component of a work table assembly 10 in which the table 11 extends outwardly from the front wall along its upper edge. At the junction of the front wall table, the assembly is recessed to receive a stationary knife 15. Such assembly and manner of mounting the same constitute the subject of my application for Knife Adjustment for Shear Machine, Serial No. 528,396, filed August 15, 1955, now U.S. Patent 2,939,358.

The front edge portion of the side walls above the throats is set back somewhat to permit of slidably supporting a ram 17 which carries the upper knife 19 of the machine in proper shearing relationship to the fixed or stationary knife 15, the upper knife being set at a desired rake angle to facilitate the shearing operation.

The operating movements of the ram are controlled hydraulically in the machine under consideration by a hydraulic system including a left cylinder assembly 33 and a right cylinder assembly 35, affixed to the upper front edges of the side walls of the machine housing and coupled to the ram by a pivotal connection such as provided by a ball and socket joint. Thus each end of the ram will be powered by one of the cylinder assemblies, which includes a cylinder 37 and included piston 39, the cylinder being fixed to the proximate side wall of the machine and its piston connected by a piston rod 40 to the ram through an associated pivotal connection.

The present invention involves hold-down assembly means for holding work to the work table as the ram 17 and its associated upper knife 19 are driven downwardly to perform a shearing operation.

Such hold-down assembly means involves a plurality of hold-down cylinder assemblies 41, each involving a cylinder 42 suspended from a beam 43 which is rigidly fixed between the two power cylinders 37. Included in each hold-down cylinder 42 is a piston 44 terminating externally of the cylinder in a bolted piston head 45. The piston is supported from compression springs 47, 48 by a suspension bolt 49, such springs serving to normally urge the piston to a retracted position in its cylinder. A flow passage 50 in the mounting beam and leading into the cylinder 42, enables the piston to be hydraulically driven downwardly against the restoring action of the springs.

Supported by the pistons transversely of the machine, is a hold-down bar 51. This bar is preferably affixed to the heads of the pistons by spring supported mounting bolts 53 to allow for inequalities in movement of travel of the hold-down pistons which as we shall see, can occur when only certain selected ones of the hold-down cylinder assemblies are utilized to the exclusion of the others in driving the hold-down bar.

The hold-down bar is preferably provided with a wear plate 55 along the work engaging under-surface thereof, while a similar wear plate 57 may be removably embedded in the upper surface of the table directly below the hold-down bar.

Hydraulic means is relied on to pressure actuate the hold-down bar through pressure actuation of the pistons in the hold-down cylinders, such hydraulic means including a pump 61 having a suction line connection 63 to a reservoir or supply tank 65, and a pressure flow line connection 67 from said pump to each of the hold-down cylinders in parallel such connection including the flow passage 50, whereby hydraulic pressure may be transmitted from said pump to each of said hold-down cylinders simultaneously if desired.

A by-pass release connection 71 from said pressure flow line connection 67 back to the reservoir or tank 65, and under control of a normally-open valve 73, will, when open, remove hydraulic pressure from the hold-down cylinders and permit retraction of the hold-down pistons and associated hold-down bar, through the combined action of the springs in the hold-down cylinders.

A relief valve 75 in a shunt line 77 between the output side of the hold-down pump 61 and the reservoir or tank 65 may be adjusted to determine the maximum pressure applicable to the hold-down pistons by the pump.

Through the use of a hold-down bar 51, a shear machine may be adapted to the shearing of wire mesh, wire cloth or screen, without running into the problem of stretching or distortion of the work during a shearing operation, which would result in imperfect and inaccurate shearing. This is attributable to the fact that the hold-down bar applies pressure uniformly across the woven material and close to the shearing knives, as distinguished from the application of pressure at spaced localized points, which would result if the hold-down pistons were relied on exclusively for holding the work to the table.

The use of a hold-down bar in and of itself, creates a problem where the mesh material to be sheared is apt to be of different widths. Under such circumstances, the hold-down bar will overhang the work to a greater or less extent, depending on the width of the work to be sheared, and the application of hydraulic pressure to the pistons along the overhanging portion of the hold-down bar can very likely overstress the bar, unless the bar is made exceptionally thick and heavy to withstand such stresses without flexing.

Accordingly, to solve this problem, while at the same time permitting the use of a hold-down bar of relatively light weight, I provide an arrangement whereby an operator may cause only certain pre-selected hold-down pistons to be pressure actuated to the exclusion of the other pistons, which other pistons will then be drawn down out of their cylinders, by the hold-down bar as it moves downward in response to those hold-down pistons which are pressure actuated. The selected pistons to be pressure actuated, will be those disposed above the work to be sheared, whereby the holding pressure will be applied directly to the work, with no pressure applied to the overhanging portions of the hold-down bar.

To effect the foregoing mode of operation, in which the pressure actuated pistons may be pre-selected, I provide a neutral flow line connection 81 from the reservoir or tank 65 to each of the hold-down cylinders said neutral flow line connection also including the flow passage 50, and introduce a two-position manually controlled switching valve 83 in the common connection or flow passage 50 to each of the hold-down cylinders, whereby each such cylinder may be switched from the pressure line connection 67 to the neutral flow line connection 81 or vice versa, at the will of the operator.

Those cylinders which may at any time be connected through the neutral line connection 81 to the reservoir or tank 65, will merely suck liquid into the cylinder during downward movement of the hold-down bar 51 and upon retraction of the hold-down bar, the resulting movement of the associated pistons in these cylinders will drive the liquid back to the reservoir or tank.

Regardless of which hold-down piston or combination of pistons are thus pressure actuated, it is imperative that the hold-down bar maintain parallelism with the table on which the work is placed, in spite of the different stress conditions developed in those portions of the hold-down bar which are not loaded and which might tend to throw the hold-down bar out of parallelism. To assure maintenance of parallelism with the work supporting table at all times, I provide means for equalizing the travel of the bar at both ends which in turn will equalize travel throughout its entire length despite any unbalance in the locations of the pressure actuated pistons.

Such equalizing means includes an upright 87 at each end of the hold-down bar, with an upper and lower cable anchor means 89 and 91 respectively on each of these uprights.

To a fixed component of the machine such as the beam 43, and at a location intermediate the upper and lower cable anchor means of each upright, are rotatably mounted a pair of cable guide means, which in the preferred embodiment, may take the form of a pair of sprockets 93, 95 on a shaft 97 mounted in a yoke 99 anchored to the beam 43.

A cable 101 anchored at one end to the upper anchor means 89 of one upright 87, is passed under one of the proximate cable guide means 93, then over the corresponding cable guide means 93 adjacent the opposite upright 87, and then anchored at its other end to the lower anchor means 91 of the opposite upright.

Similarly, a cable 103 anchored at one end to the upper anchor means 89 of the opposite upright, is passed under the proximate remaining cable guide means 95, then over the remaining cable guide means 95 in proximity to the first upright, and then anchored at its other end to the lower anchor 91 means on the first upright.

When the cable guide means takes the form of sprockets as described, at least those portions of the cables which ride over these sprockets will be formed of chain. Also included in each cable is a preloading spring coupling 105 and a turnbuckle 107 whereby each cable may be pre-loaded to exceed the effective lifting force of the springs 47, 48 in the hold-down cylinders 42.

Each cable when so preloaded, will exert a lifting force at one end of the hold-down bar, and a corresponding lowering force at the other end of the hold-down bar, through the respective uprights, but the forces exerted by one cable will oppose those exerted by the other cable. The tensions in the cables will be so adjusted as to just balance out. Thereafter when the hold-down bar is in parallelism with the table, any tendency on the part of the hold-down bar to depart from parallelism, will cause these cable forces to unbalance in compensating directions so as to oppose and neutralize such tendency for the hold-down bar to depart from parallelism and thereby maintain the same in parallelism at all times.

An adjustable stop 108 on each upright 87 determines the permissible rise of the hold-down bar with respect to the work.

Though the hold-down assembly means described above may be incorporated into any type of shear machine and the like, it is disclosed in the drawings as incorporated in a shear machine of the hydraulic type which is electrically controlled, and in this connection a feature of the invention lies in the cooperation existing between the hold-down assembly means and the operation of the upper knife, whereby such knife cannot go into operation until the hold-down means has first successfully engaged and clamped the work to the table.

Hydraulic energy for the work stroke of the ram which carries the upper knife is applied from a tank or reservoir 65 by a main pump 111 through a main flow line 113 and by way of a "down" valve 115 to the upper end of the cylinder assembly 33, which in turn is hydraulically connected in series with the other cylinder assembly 35 by a connecting line 117 from a point below the piston of the cylinder assembly 33 to the upper end of the cylinder 37 of the other assembly 35.

The circuit is completed by a return line 119 from the lower end of the cylinder of the latter assembly 35 through a foot valve 121 and a check valve 123 back to the tank or reservoir 65 from which the main pump derives its liquid. The check valve 65 creates sufficient back pressure to support the ram in its uppermost position.

The "down" valve 115 is a solenoid operated valve which is normally open when not energized, and the foot valve 121 is similar in nature, in that it also is a solenoid operated valve which is normally open when not energized.

The cylinder assemblies 33, 35 are thus operated in series, and to assure equal rate of travel of both power pistons 39, all other factors being favorable, the cylinder assembly 33 is so designed that the under-surface of its piston equals in area the upper surface of the piston in the second cylinder assembly 35.

For upward or return movement of the ram 17, the output of the main pump is caused to flow in a reverse direction to the cylinder assemblies 33, 35, the flow of liquid being through an "up" valve 125 to the under side of the smaller piston of the cylinder assembly 35 and from the upper end of the cylinder assembly 33 through an operating dump valve 127 and back to the supply tank. Both the "up" valve 125 and the operating dump valve 127 are similar to previously described valves 115 and 121 in being solenoid operated and normally open when not energized.

For emergency use, a direct line connection 131 back to the supply tank or reservoir 65 from the main line 113 of the main pump 111 is provided through an emergency stop valve 133, which is also of the solenoid operated type, this valve like the others previously discussed, being normally open when not energized.

A by-pass 135 around this emergency stop valve 133 includes a relief check valve 137 and will serve to safeguard the system against building up of excessive pressures, as determined by the setting of this check valve.

All of the aforementioned solenoid operated valves tie in with the operation of the shear machine and are interlinked therewith by means of electrical circuits to assure operation in the manner indicated.

In this connection, the machine is provided with depth stop means for determining the lower limit of travel of the ram, this involving a vertical scale 141 affixed to an edge of the ram and carrying a bracket at its upper end in which is adjustably mounted a switch actuating stop 143.

Affixed to a stationary portion of the machine such as a side wall and in the line of travel of the stop 143 is a micro-switch 145 having upper and lower spaced apart contacts with a spring armature between and normally engaging the upper contact. This switch is so located as to be actuated by the stop 143 when the ram reaches its lower limit of intended travel. The aforementioned depth stop means is mounted at that end of the machine at which the lower end of the angularly mounted shear blade is located.

The bracket which carries the depth stop is preferably adjustably mounted on the scale 141 whereby to control the length of the down stroke of the ram and thus alter the lower limit of travel of the ram. The adjustability of the stop permits of determining the stroke length with precision.

The upper limit of travel of the ram, as is also its upper rest position, is determined by a back travel stop assembly. This involves a bracket mounted on the scale toward its lower end and carrying an upwardly facing adjustable stop 149. Mounted on a fixed portion of the machine, such as the proximate side wall, and in line of travel of the stop 149, is a micro-switch 151 having a single contact and a spring armature normally in engagement with such contact but adapted to be disengaged by the back travel stop to open such switch when the ram reaches its upper limit of travel.

In conjunction with the energization of the various valves to determine operation of the hold-down means and the ram which carries the upper shear knife, are a hold-down relay 157, a "down" relay 159 and an "up" relay 161.

The hold-down relay 157 includes a winding 163 connected in a circuit between power supply lines 165, 167, which may be traced from one of the lines 165 through a normally closed push button switch 169, a normally open push button switch 171, a normally closed pair of contacts 173 associated with the "down" relay, a normally closed pair of contacts 175 associated with the "up" relay, and the winding 163 of the hold-down relay, then through a series connected pair of emergency stop limit switches 177, 179 to the other line 167.

Across the normally open push button switch 171, are connected a pair of normally open contacts 181 associated with the hold-down relay 157. Therefore, upon closing of the normally open push button switch 171, the hold-down relay will become energized and close contacts 181 to establish a holding circuit.

At the same time, the energized hold-down relay will close a pair of normally open contacts 185 which upon closing, will connect the solenoid 187 of the hold-down release valve 73 across the lines. The energization of the solenoid of this valve, closes the valve, thus setting the hold-down assembly into operation.

The hold-down relay, upon being energized, also opens a pair of normally closed contacts 191 associated therewith, which lie in the circuit through the winding 193 of the "up" relay 161, such circuit beginning with the line 165, including a pair of normally closed contacts 197 of the "down" relay, the back travel limit switch 151, the normally closed contacts 191 of the hold-down relay 157, a manually operable "inch" switch 199, the relay winding 193 and back to the other line 167 through the series connected emergency stop switches 177, 179. Thus, while the hold-down relay 157 is energized, it will open contacts 191 and assure against the "up" relay becoming energized.

To initiate a down stroke of the upper knife of the shear, the "up" valve 125 and the operating dump valve 127 are caused to close, thus leaving the "down" valve 115 and the foot valve 121 open.

The electrical circuit for energizing the "up" valve and the operating dump valve may be traced from the line 165 through a foot switch 201, the upper contact of the depth limit switch 145, a pair of normally closed contacts 203 of the "up" relay 161, the normally open contacts 205 of a pressure switch 207, the winding 209 of the "down" relay, then back to the other line 167 through the series connected emergency stop switches 177, 179.

In practice the foot switch will be connected at the end of a cable enabling the switch to be shifted to suit the convenience of the operator.

The pressure switch 207 with which the normally open contacts 205 are associated, is preferably of the diaphragm type, with the region 210 behind the diaphragm connected by a flow connection 211 with the hold-down pump pressure connection 67 of the hold-down hydraulic system, whereby, following contact of the hold-down bar 51 with the work on the work table, the hydraulic pressure in the hold-down system will increase, as a consequence of which, the pressure switch will function to close its associated contacts, which as previously indicated, lie in the circuit through the winding 209 of the "down" relay 159. When thus closed, the pressure switch conditions the "down" relay energizing circuit for operation upon closure of the foot switch 201. From this it will become apparent, that the "down" relay cannot be energized until the hold-down assembly has functioned properly to clamp the work to the work table. This is an important feature of the present invention.

Interconnecting the energizing circuit for the "down" relay from a point 213 between the normally closed contacts 203 of the "up" relay and the normally open contacts 205 of the pressure switch, to a point 215 in the energizing circuit for the solenoid 187 of the hold-down release valve 73, is a holding circuit involving in parallel, a pair of normally open contacts 217 associated with the "down" relay and a pair of normally closed contacts 219 of the hold-down relay 157.

With energization of the hold-down relay, these normally closed contacts 219 are opened and the holding circuit is rendered ineffective, it being noted that the contacts 217 in parallel therewith are normally open when the controlling "down" relay is not energized.

However, upon energization of the "down" relay, the normally open contacts 217 associated therewith are then closed, thus connecting the solenoid 187 of the hold-down release valve 73 in circuit with the foot switch 201 so that as long as the foot switch is held closed, the hold-down release valve 73 will be energized to its closed condition to permit of functioning of the hold-down bar. This holding circuit is thus established upon energization of the "down" relay, which at the same time opens the normally closed contacts 173 in the circuit to the hold-down relay 157 thus breaking this circuit and de-energizing the hold-down relay causing its holding circuit contacts 181 to re-open and its other contacts 219 in the holding circuit for the hold-down release valve 73, to close.

With the closing of the foot switch 201 and the resulting energizing of the "down" relay 159, the "down" relay further functions to close a pair of normally open contacts 225 in a circuit to the solenoids 227, 229 of the "up" valve 125 and the operating dump valve 127 respectively, thus leaving the main pump 111 free to force liquid into the upper end of the larger cylinder assembly 33, and by reason of the series connection of the two cylinder assemblies, the smaller assembly 35 will then return liquid to the tank 65 through the foot valve 121. The resulting downward movement of the ram 117 and associated upper knife 19, will continue until the depth stop 143 on the ram strikes the depth limit switch 145 causing a break at its upper contact and a closing of a circuit at the lower contact.

The opening of the circuit at the upper contact of the depth limit switch constitutes a break in the foot switch circuit, both through the "down" relay winding 209 and the holding circuit to the solenoid 187 of the hold-down release valve 73, the upper contact of the depth limit switch 145 being common to both circuits. Thus downward movement of the upper knife 19 is stopped and the hold-down bar 51 will be restored to its upper position by the restoring springs 47, 48. The resulting reduction in hydraulic pressure in the hydraulic circuit of the hold-down assembly will cause the pressure switch 207 to open, thus breaking the circuit to the "down" relay at this point.

With the inch switch 199 open, the winding of the "up" relay 161 can never be energized and the ram will remain at its lowermost position.

With the inch switch closed, the prior de-energization of the "down" relay 159 and the hold-down relay 157 will permit normally closed contacts 197 of the "down" relay and normally closed contacts 191 of the hold-down relay to return to their closed condition, thus completing an energizing circuit through the winding 193 of the "up" relay, which circuit may be traced from the line 165 through the normally closed contacts 197 of the "down" relay, the contacts of the back travel limit switch 151, the normally closed contacts 191 of the hold-down relay, the inch switch 199 and then through the winding 193 of the "up" relay, to the other side of the line through the series connected emergency stop switches 177, 179.

The "up" relay will thereupon close a pair of associated normally open contacts 235 to connect the solenoid 237 of the "down" valve 115 and the solenoid 239 of the foot valve 121 across the lines 165, 167, to cause both these valves to close, thus leaving the "up" valve 125 and the operating dump valve 127 open to permit flow of hydraulic liquid to the ram operating cylinder assemblies 33, 35 in the reverse order, to lift the ram and its associated upper knife.

Such upward movement of the ram will continue until the back travel limit switch 151 is struck by the stop 149 carried by the ram, to open its contacts, which in turn will break the circuit to the "up" relay and cause the ram to halt.

During upward or return movement of the ram, the energized condition of the "up" relay causes a pair of its normally closed contacts 175 in the hold-down relay circuit to open, thereby rendering it impossible to close the circuit through the hold-down relay 157 by accidentally or otherwise closing the normally open push button switch 171.

The normally closed push button switch 169 in the hold-down relay circuit, enables an operator to break this circuit at any time, this being important in the positioning of work on the work table and prior to closing of the foot switch to initiate a cutting stroke of the machine.

The emergency stop valve 133 has its associated solenoid 241 connected across the lines 165, 167 through the series connected emergency stop switches 177, 179. These switches are normally closed, to complete a circuit through the solenoid 241 of the emergency operating valve, so as to maintain this valve in its closed condition during normal operation of the machine. However, these emergency stop switches are so related to the ram that should the ram tilt in one direction or the other to a degree which may endanger the machine, one of the switches will be opened to break the circuit to the solenoid of the emergency stop valve, causing this valve to open and short-circuit the main pump and take pressure off the main hydraulic system of the machine.

Also similarly related to the ram are a pair of normally open level control switches 245, 247 either of which will respond to a less severe tilt of the ram depending on the direction of tilt, to close a circuit through one or the other of solenoids 251, 253 of a pair of level controlled valves 255, 257 respectively, such circuit including a pair of normally open contacts 258 of the "up" relay. One such valve 255 is in a flow connection 259 from the interconnecting flow line 117 between the two cylinder assemblies, to the tank or reservoir 65, while the other 257 is in a flow line connection 261 from the same interconnection 117 to the lower end of the smaller cylinder assembly 35.

A check valve 265 in the flow connection of this latter level control valve, permits flow only in the direction from the lower end of the cylinder assembly to the upper end thereof.

The emergency stop limit switches 177, 179 and the level control limit switches 245, 247, and associated solenoid control valves 255, 257 do not form part of the present invention and further description thereof is deemed unnecessary.

From the system as thus described, it will be appreciated that operations of the ram and associated upper knife cannot occur in the absence of proper functioning of the hold-down assembly and further that upon proper functioning of the hold-down assembly, the operating controls of the machine will be properly set up by the functioning of the pressure switch.

Shear machines of the type to which the present invention in particular relates, may be of substantial length, of the order of ten or fifteen feet, which would necessitate considerable walking and waste of time if the operator had to move between a fixed location of the hold-down relay push button switches and the work in setting up the work and operating the machine. These switches, accordingly are assembled in a housing 271 which is slidably mounted in a dove-tail groove 273 formed in the edge of the table 11.

A plurality of tiltable mirrors 275, suspended from the beam 43, enable the operator to view conditions behind the hold-down bar, regardless of the operating position of the operator.

From the foregoing description of my invention, in its preferred form, it will be apparent that the same fulfills all the objects of my invention, and while I have illustrated and described the same in considerable detail, the invention is subject to alteration and modification without departing from the underlying principles involved, and I accordingly do not desire to be limited in my protection to the specific details thus illustrated and described, except as may be necessitated by the appended claims.

I claim:

1. In a shear machine or the like wherein an operation on work occurs beyond but adjacent an end of a work table, work hold-down means for clamping work to such work table, said hold-down means comprising a plurality of individually operable hold-down cylinder assemblies, each mounted above such work table and including a cylinder and a piston slidable therein, a hold-down bar affixed to and common to said pistons for movement in response to movement of said pistons, hydraulic means for driving said pistons, means for selecting hold-down pistons to be actuated by said hydraulic means to the exclusion of others of said pistons, and means for venting those hold-down cylinders associated with the unselected pistons.

2. In a shear machine or the like, work hold-down means for clamping work to a work table or the like of such machine, said hold-down means comprising a plurality of hold-down cylinder assemblies, each mounted above such work table and including a cylinder and a piston slidable therein, a hold-down bar affixed to and common to said pistons for movement in response to movement of said pistons, hydraulic means for driving said pistons, said hydraulic means including a power flow connection to an end at each of said cylinders, a neutral flow connection to said end also of each of said cylinders and manually controlled means for pre-selecting individual pistons of said cylinder assemblies to be driven by said hydraulic means, said manually controlled means including a two position valve in the power flow and neutral flow connections to each cylinder.

3. Hold-down assembly for a shear or like machine having a lower knife, a ram above said lower knife, an upper knife carried by said ram, a work supporting table terminating adjacent said lower knife, and hydraulic means for driving said ram and upper knife toward said lower knife, said hold-down assembly comprising a plurality of individually operable hold-down cylinder assemblies, each including a cylinder having an input opening, a piston slidably installed in said cylinder, and means for urging said piston toward a retracted position in said cylinder, means supporting said hold-down cylinder assemblies above said table transversely thereof and in spaced relationship to each other, a hold-down bar extending across and affixed to said hold-down pistons, and means for pressure actuating certain only of said pistons to the exclusion of others.

4. Hold-down assembly for a shear or like machine having a lower knife, a ram above said lower knife, an upper knife carried by said ram, a work supporting table terminating adjacent said lower knife, and hydraulic means for driving said ram and upper knife toward said lower knife, said hold-down assembly comprising a plurality of individually operable hold-down cylinder assemblies, each including a cylinder having an input opening, a piston slidably installed in said cylinder, and means for urging said piston toward a retracted position in said cylinder, means supporting said hold-down cylinder assemblies above said table transversely thereof and in spaced relationship to each other, a hold-down bar extending across and affixed to said hold-down pistons, means for pressure actuating certain only of said pistons to the exclusion of others, and means for equalizing travel of said bar throughout its length despite any unbalance in the locations of the pressure actuated pistons.

5. Hold-down assembly for a shear or like machine having a lower knife, a ram above said lower knife, an upper knife carried by said ram, a work supporting table terminating adjacent said lower knife, and hydraulic means for driving said ram and upper knife toward said lower knife; said hold-down assembly comprising a plurality of individually operable hold-down cylinder assemblies, each including a cylinder having an input opening, a piston slidably installed in said cylinder, and spring means normally urging said piston toward a retracted position in said cylinder, means supporting said hold-down cylinder assemblies above said table transversely thereof and in spaced relationship to each other, a hold-down bar extending across and affixed to said hold-down pistons with one edge of said bar close to said lower knife when said bar is lowered to said table, means for pressure actuating certain only of said pistons to the exclusion of others, said means including a pump, a pressure flow line connection from said pump to each of said hold-down cylinders, a reservoir, a neutral flow line connection from said reservoir to each of said hold-down cylinders, a two position valve in the pressure flow line and neutral flow line connections to each of said cylinders and adapted to open a cylinder to one or the other of said flow line connections leading thereto, a cylinder by-pass release connection from said pressure flow line connection, and a valve in said release connection, whereby when said valve is in its closed condition, said pump will pressure drive those hold-down pistons only, relative to which, the associated two position valves are open to the pump pressure flow line connection thereto and drive said hold-down bar downwardly toward said table, and means for equalizing travel of said bar throughout its length despite any unbalance in the locations of the pressure actuated pistons.

6. Hold-down assembly for a shear or like machine having a lower knife, a ram above said lower knife, an upper knife carried by said ram, a work supporting table terminating adjacent said lower knife, and hydraulic means for driving said ram and upper knife toward said lower knife; said hold-down assembly comprising a plurality of hold-down cylinder assemblies, each including a cylinder having an input opening, a piston slidably installed in said cylinder, and spring means normally urging said piston toward a retracted position in said cylinder, means supporting said hold-down cylinder assemblies above said table transversely thereof and in spaced relationship to each other, a hold-down bar extending across and affixed to said hold-down pistons with one edge of said bar close to said lower knife when said bar is lowered to said table, means for pressure actuating certain only of said pistons to the exclusion of others, said means including a pump, a pressure flow line connection from said pump to each of said hold-down cylinders, a reservoir, a neutral flow line connection from said reservoir to each of said hold-down cylinders, a two position valve in the pressure flow line and neutral flow line connections to each of said cylinders and adapted to open a cylinder to one or the other of said flow line connections leading thereto, a cylinder by-pass release connection from said pressure flow line connection, and a valve in said release connection, whereby when said valve is in its closed condition, said pump will pressure drive those hold-down pistons only, relative to which, the associated two position valves are open to the pump pressure flow line connection thereto and drive said hold-down bar downwardly toward said table, and means for equalizing travel of said bar throughout its length despite any unbalance in the locations of the pressure actuated pistons, said means including an upright at each end of said hold-down bar, upper cable anchor means and lower cable anchor means on each of said uprights, a pair of cable guide means rotatably secured to a fixed component of such shear machine adjacent each of said uprights and intermediate the anchor means thereon, a cable anchored at one end to the upper anchor means of one upright, passing under one of the proximate cable guide means, then over the corresponding cable guide means adjacent the opposite upright and anchored at its other end to the lower anchor means of said opposite upright, and a similar cable anchored at one end to the upper anchor means of said opposite upright, passing under the proximate remaining cable guide means, then over the remaining cable guide means in proximity to the first upright and anchored at its other end to the lower anchor means on said first upright.

7. Hold-down assembly for a shear or like machine having a lower knife, a ram above said lower knife, an upper knife carried by said ram, a work supporting table terminating adjacent said lower knife, and hydraulic means for driving said ram and upper knife toward said lower knife; said hold-down assembly comprising a plurality of hold-down cylinder assemblies, each including a cylinder having an input opening, a piston slidably installed in said cylinder, and spring means normally urging said piston toward a retracted position in said cylinder, means supporting said hold-down cylinder assemblies above said table transversely thereof and in spaced relationship to each other, a hold-down bar extending across and affixed to said hold-down pistons with one edge of said bar close to said lower knife when said bar is lowered to said table, means for pressure actuating certain only of said pistons to the exclusion of others, said means including a pump, a pressure flow line connection from said pump to each of said hold-down cylinders, a reservoir, a neutral flow line connection from said reservoir to each of said hold-down cylinders, a two position valve in the pressure flow line and neutral flow line connections to each of said cylinders and adapted to open a cylinder to one or the other of said flow line connections leading thereto, a cylinder by-pass release connection from said pressure flow line connection, and a normally open valve in said pressure release connection, whereby upon closing of said normally open valve, said pump will pressure drive those hold-down pistons only, relative to which, the associated two position valves are open to the pump pressure flow line connection thereto and drive said hold-down bar downwardly toward said table, and means for equalizing travel of said bar throughout its length despite any unbalance in the locations of the pressure actuated pistons, said means including an upright at each end of said hold-down bar, upper cable anchor means and lower cable anchor means on each of said uprights, a pair of sprockets rotatably secured to a fixed component of such shear machine adjacent each of said uprights and intermediate the anchor means thereon, a cable anchored at one end to the upper anchor means of one upright, passing under one of the proximate sprockets, then over the corresponding sprocket adjacent the opposite upright and anchored at its other end to the lower anchor means of said opposite upright, and a similar cable anchored at one end to the upper anchor means of said opposite upright, passing under the proximate remaining cable guide means, then over the remaining cable guide means in proximity to the first upright and anchored at its other end to the lower anchor means on said first upright, said cables each including sprocket chain in at least those portions where said cables engage and ride said sprockets.

References Cited in the file of this patent

UNITED STATES PATENTS

| | | |
|---|---|---|
| 963,348 | Wood | July 5, 1910 |
| 1,467,201 | Shriver | Sept. 4, 1923 |
| 2,217,783 | Bell | Oct. 15, 1940 |
| 2,230,802 | Klein | Feb. 4, 1941 |
| 2,558,071 | Castle et al. | June 26, 1951 |
| 2,654,429 | Rupp | Oct. 6, 1953 |
| 2,766,825 | Pater et al. | Oct. 16, 1956 |
| 2,781,844 | Pearson et al. | Feb. 19, 1957 |

FOREIGN PATENTS

| | | |
|---|---|---|
| 427,155 | Germany | May 27, 1926 |